G. F. CRASS.
SHOCK ABSORBING WHEEL.
APPLICATION FILED AUG. 10, 1908.

935,622.

Patented Sept. 28, 1909.

WITNESSES
C. K. Reichenbach
M. E. Losong

INVENTOR
George F. Crass
By T. R. Bryant, Attorney

UNITED STATES PATENT OFFICE.

GEORGE F. CRASS, OF ITHACA, NEW YORK, ASSIGNOR OF ONE-HALF TO DAVID FINKELSTEIN, OF ITHACA, NEW YORK.

SHOCK-ABSORBING WHEEL.

935,622.  Specification of Letters Patent.  Patented Sept. 28, 1909.

Application filed August 10, 1908. Serial No. 447,694.

*To all whom it may concern:*

Be it known that I, GEORGE F. CRASS, a citizen of the United States, residing at Ithaca, in the county of Tompkins and State of New York, have invented certain new and useful Improvements in Shock-Absorbing Wheels, of which the following is a specification.

This invention relates to improvements in vehicle wheels, and is more especially designed for use upon automobiles, and relates to that class of wheels known as shock absorbing wheels.

The principal object is to provide a wheel combining all the advantages of the ordinary pneumatic tired wheel, and eliminating its objectional features, the present invention providing a resilient means between the hub and rim of the wheel.

A further object of the invention is the provision of a wheel of this character of such a construction as to permit of a slight rotary movement of the hub relative to the wheel rim, which is adapted to absorb any shocks given to the driving wheels of automobiles.

In carrying out the above functions and advantages and in producing a wheel adapted to overcome the shocks and jars given in traveling over rough road-beds, I have constructed a device exceedingly simple and cheap to manufacture, which at the same time is believed to be more serviceable, as well as practicable, than any forms now in use.

With these general objects in view and others which will appear as the nature of the improvement is better understood, the invention consists, substantially, in the novel construction, combination, and arrangement of parts, which will be hereinafter fully described, illustrated in the accompanying drawings and pointed out in the appended claims.

Figure 1:
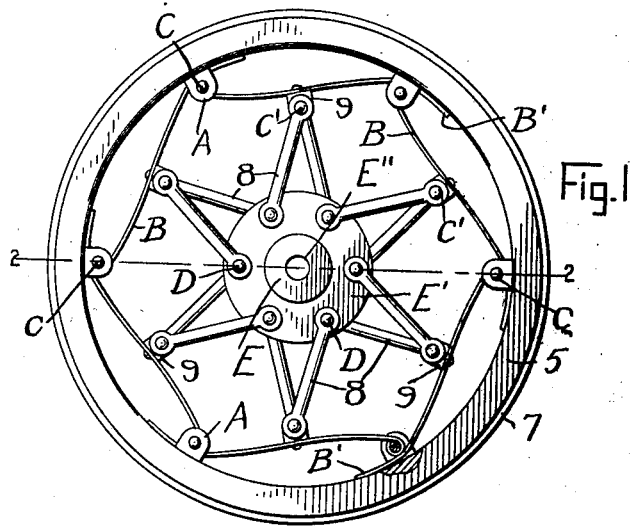
Figure 2:
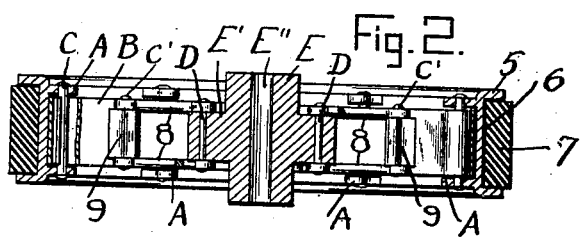
Figure 3:
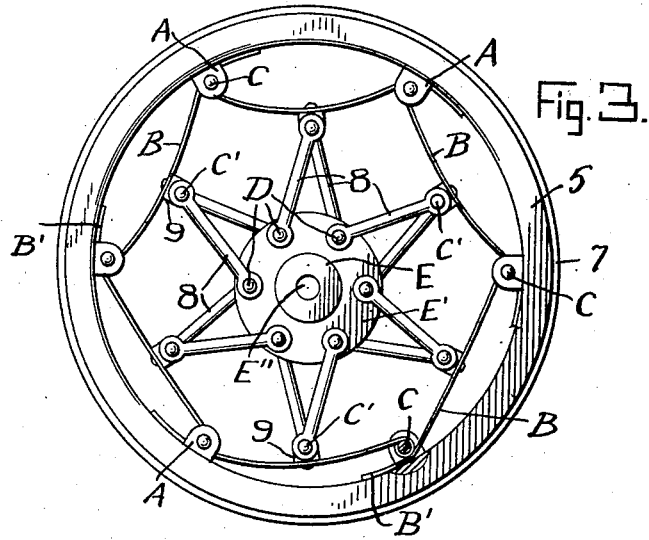
Figure 4:
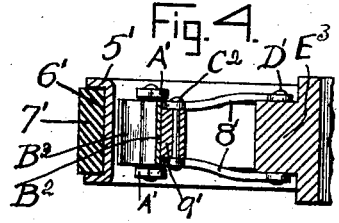

In the drawings forming a part of this application, and in which like characters of reference indicate similar parts throughout the several views, Figure 1 is a side elevation of my improved shock absorbing wheel; Fig. 2 is a transverse central sectional view of Fig. 1; Fig. 3 is a similar view to Fig. 1, but illustrating the cushioning action of the spring members. Fig. 4 is a detail view on a smaller scale showing a modified form of the device employing converging spokes.

Referring in detail to the drawings, E designates the hub of the wheel, having the central annular shoulder or flange E' and the transverse central bore, E'', the latter being adapted for attachment to the vehicle axle.

5 designates the wheel rim which is provided with the exterior annular depression 6, for receiving a tire, 7, preferably composed of rubber. In this connection it will be noted that any form of tire and any form of rim or felly may be employed but I preferably employ the metallic rim 5 for positioning the resilient tire 7.

Arranged radially and preferably integral with the above described metallic rim, I provide oppositely arranged lugs or ears, A, each pair thereof provided with alining perforations for receiving pins or bolts, C. Pivoted between each pair of lugs upon this connecting pin or bolt, C, is arranged a resilient flat spring member, B, having one end pivotally secured as aforesaid. The opposite ends of said spring members are free and unattached but the movement thereof is restrained by the placing of said free ends between the lugs and under the pin of the next adjacent set of lugs. The said free end of each of the spring members is arranged to extend through said alining lugs and has a projecting free end, B', adapted to insure the retention of the spring members in restrained relation with respect to the rim. On the inner surface of said spring members and at central points intermediate the ends thereof are positioned rectangular blocks, 9, which are substantially of a width equal to that of the spring members and preferably of the same width as the shoulder E' of the hub.

I provide connecting spokes of double the number of the spring members; said spokes designed as 8 are arranged in pairs, one end of each pair being secured to a block, 9, by a pin or bolt, C', passing through said spoke ends and a perforation provided through said block. Said spoke ends being secured to opposite ends of said block are thus arranged upon opposite sides of the wheel and the other ends of said spokes are secured to opposite sides of the hub flange by bolts or rivets, D. The arrangement of spokes is such that each bolt, D, passes through the hub flange and secures one end of each oppositely adjacent spoke on each side thereof.

The lugs, A, may be struck up, formed integral with or attached in any desired manner, to the metallic rim. The number of spring members and attaching spokes may be varied as desired but it is believed that the preferable embodiment of the device is herewith illustrated and presents the outline of the spokes in the completed wheel as of a six pointed star shape. It is obvious that with the employment of a less number of spring members, a correspondingly less number of spokes would be used and their points of attachment to the hub flange would be spaced farther apart. It will be noted that each of the pins or bolts, C, C', and D, furnish pivots for the respective members connected thereby, and that the movement of the free end of each spring member is a slight longitudinal reciprocation between the pins, C, and the metallic rim.

The modified form disclosed in Fig. 4 provides a suitable hub flange $E^3$ to which are secured as by the pins or bolts D' the spokes S' converging outwardly and having their outer ends secured to the block 9', which is of less width than the said hub flange. The pins $C^2$ are employed for securing the spokes to said block, which latter is mounted upon the spring member $B^2$ pivoted to the rim 5' between the lugs A' and the opposite end $B^3$ of said spring member is flatly positioned upon the rim, said rim having the depression 6' for receiving a tire 7'.

The operation of my device will be clearly seen by referring to Fig. 3. With the weight of the vehicle sustained by the hub, E, and exerting vertical strain thereon, the extension and tension of the respective spring members, B, is clearly shown. The members lying adjacent to the lower side of the rim are compressed, while those at the top are in opposed relation thereto and are slightly extended or drawn downwardly; and the intermediate spring members at the sides have exerted thereon a complex strain, consisting of both a downward and an inward impulse. By the use of the wheel as a power means, a forcible rotation of the hub will in its initial movement slightly operate upon all of the spring members in imparting to said hub a fractional rotation before communicating the power to the rim or wheel proper. These advantages in operation of this device are self evident and it is believed that the same has not been heretofore approximated.

While the forms of the invention herein shown and described are what are believed to be the preferable embodiments thereof, it is to be understood that the same are susceptible of various changes in the form, proportion, and minor details of construction, and the right is therefore reserved to modify or vary the invention as falls within the spirit and scope thereof.

Having thus described my invention and in what manner the same is to be used, what is claimed as new and desired to be secured by Letters Patent of the United States, is—

1. In a wheel, a rim and a hub, resilient members pivoted to said rim at one end and the other end free being freely slidable upon said rim, blocks provided upon said members and intermediate the ends thereof, and spokes pivoted between said blocks and the hub.

2. In a wheel, a rim and a hub, resilient members pivoted to the rim and provided with blocks, spokes pivoted to each end of the blocks and to opposite sides of said hub.

3. In a wheel, a rim and a hub, said rim provided with radial lugs arranged in pairs, resilient members pivoted at one end between each pair of lugs and having its other end slidably movable between the adjacent pair of lugs, blocks positioned upon said members, an annular shoulder provided upon said hub, spokes pivoted to opposite ends of said blocks, and the opposite sides of said shoulder.

4. In a wheel, a rim and a hub, said rim provided with oppositely arranged radial lugs, alining perforations provided in said lugs, bolts passing through said perforations, resilient members mounted at one end upon said bolts, the other end of said resilient members slidably contacting the inside of the rim between the adjacent lugs and beneath the bolts connecting the latter, rectangular blocks positioned upon the resilient members at points intermediate the ends thereof, an annular shoulder carried by said hub, an equal number of spokes on each side of the wheel connecting said blocks with said annular shoulder.

In testimony whereof I affix my signature in presence of two witnesses.

GEORGE F. CRASS.

Witnesses:
T. K. BRYANT,
J. J. McGUIRE.